Feb. 3, 1953  R. G. LE TOURNEAU  2,627,197
LATHE

Filed April 12, 1947  3 Sheets-Sheet 1

INVENTOR.
R. G. LeTourneau
ATTYS

Feb. 3, 1953    R. G. LE TOURNEAU    2,627,197
LATHE

Filed April 12, 1947    3 Sheets-Sheet 2

INVENTOR.
R. G. LeTourneau
BY
ATTYS

Feb. 3, 1953  R. G. LE TOURNEAU  2,627,197
LATHE
Filed April 12, 1947  3 Sheets-Sheet 3

INVENTOR.
R. G. LeTourneau
BY
Webster & Webster
ATTYS

Patented Feb. 3, 1953

2,627,197

UNITED STATES PATENT OFFICE 2,627,197

LATHE

Robert G. Le Tourneau, Longview, Tex., assignor to R. G. Le Tourneau, Inc., Stockton, Calif., a corporation of California Application April 12, 1947, Serial No. 741,049

6 Claims. (Cl. 82—28)

This invention is directed to, and it is an object to provide, improvements in a machine lathe.

Another object of the invention is to provide in a lathe, a head unit which is constructed and operates in a novel manner; such head unit being slidable in controlled relation longitudinally on the ways of the lathe and carrying a rotary quill or spindle for tool or work support, and a quill actuating, electric motor is mounted on the head unit for movement therewith.

A further object of the invention is to provide a lathe head unit, as above, which includes a fluid pressure actuated power cylinder formed therein, and connected between said unit and a stationary part on the lathe bed so as to advance or retract the head unit on the lathe ways; there being stop means arranged to adjustably limit advancing motion of the head unit.

An additional object is to provide a novel assembly of adjustable ways for the longitudinally movable head unit; such way assembly assuring of accurate non-chattering lineal motion of the head unit.

A further object of the invention is to provide a practical lathe, and one which will be exceedingly effective for the purpose for which it is designed.

These objects are accomplished by means of such structure and relative arrangement of parts as will fully appear by a perusal of the following specification and claims.

Figure 1:
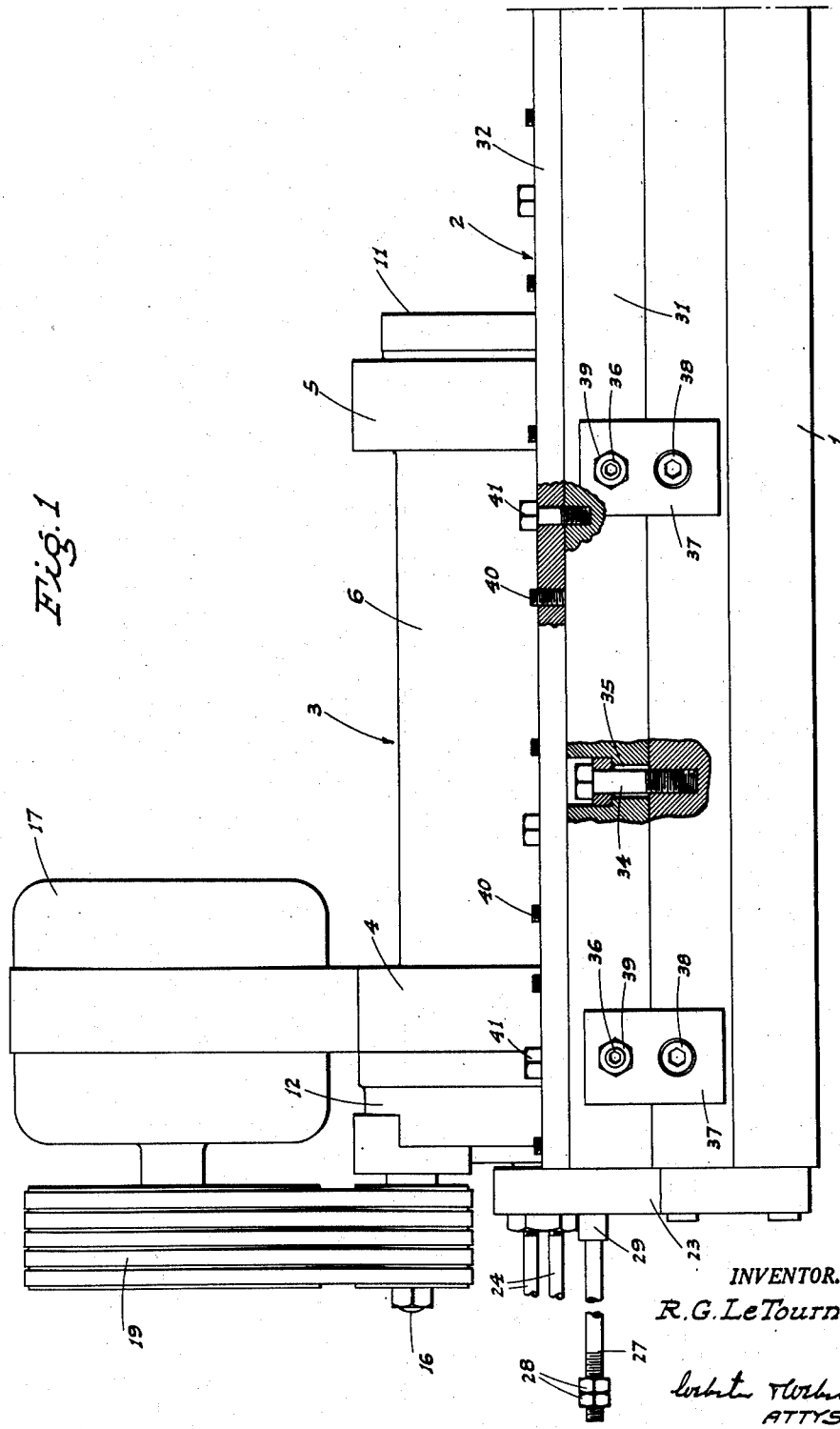
Fig. 1 is a side elevation of the lathe structure; the sliding or traveling head unit being shown in its retracted position.
Figure 2:
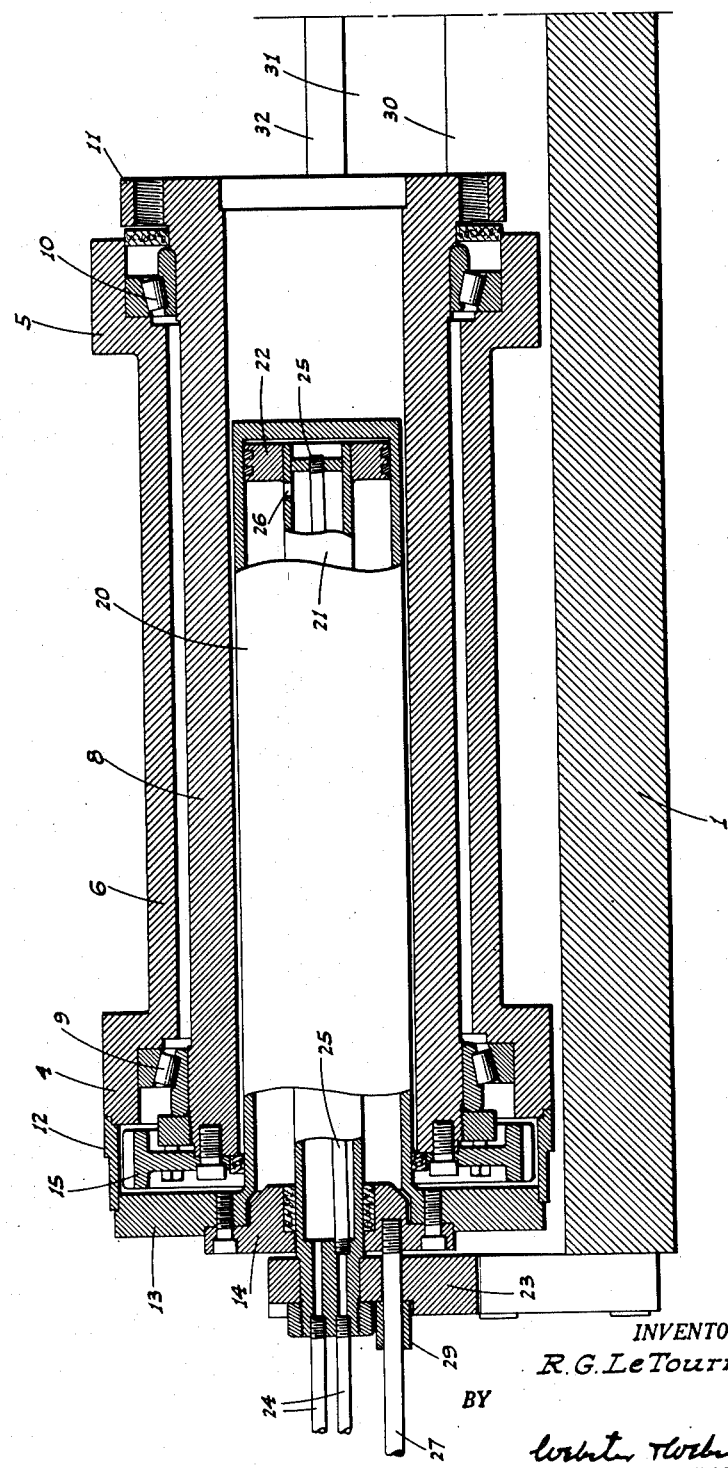
Fig. 2 is a longitudinal sectional elevation of the head unit, illustrating the fluid pressure actuated power cylinder therein.

Referring now more particularly to the characters of reference on the drawings, the improved lathe structure comprises a rigid horizontal bed 1 which may be supported from the floor in any suitable manner; such bed including longitudinally extending, transversely spaced ways 2, disposed in parallel relation, such ways being hereinafter described in detail.

A longitudinally slidable or traveling head unit, indicated generally at 3, is mounted in connection with the ways 2, and comprises a pair of spaced, substantially straight-sided, upstanding end heads 4 and 5 connected together in rigid relation by a tubular body 6. The tubular body 6 opens into the heads 4 and 5, both of which are formed with enlarged central openings, as shown.

Along opposite sides the head unit 3 includes longitudinal supporting flanges 7, rectangular in cross section, which engage in close fitting slidable relation in the ways 2, whereby said head unit 3 is guided for accurate longitudinal advancing or retracting motion.

A rotary quill or spindle 8 is disposed within the tubular body 6 and extends into the openings of the end heads 4 and 5, being supported in the latter by bearings 9 and 10. At its forward end the rotary quill or spindle 8 projects beyond the end head 5 and is formed with an enlarged attachment flange or face plate 11 adapted to have a lathe tool, or the work, mounted thereon, selectively.

At the opposite end the head unit 3 is formed with an enclosure 12 associated with the end head 4, which enclosure includes an end plate 13 and a removable end hub 14.

A driven gear 15 is fixed on the rear end of the rotary spindle 8 within the enclosure 12; said gear 15 being driven by a pinion (not shown) on a pinion shaft 16 which projects rearwardly through the end plate 13. An electric motor, indicated generally at 17, is mounted on top of the head unit adjacent its rear end and includes a drive shaft 18 coupled to the pinion shaft 16 by a multiple endless belt and pulley unit 19. With this arrangement the motor 17 moves with the head unit 3 to any position of working adjustment thereof, and serves to drive the rotary quill 8 and the tool or work carried on the outer end of the latter.

The power actuating mechanism for the head unit 3 comprises the following:

An elongated, non-rotary cylinder 20 is disposed within the rotary spindle 8 in clearance relation; said cylinder being closed at its outer end and affixed at its inner end to the end plate 13. A tubular, stationary piston rod 21 is slidable through the end hub 14 and extends centrally within the cylinder 20, and a piston 22 is affixed to the piston rod 21 at its outer end.

At its rear end the piston rod 21 is fixed in connection with a rigid upstanding end bracket 23 secured to the bed 1 at the adjacent end.

A pair of fluid pressure conduits 24 connect with the rear end of the piston rod 21, one of said conduits communicating with the interior of the rod while the other communicates with a conduit 25 leading through the rod to communication with the interior of the cylinder 20 beyond the piston 22. The interior of the piston rod 21 communicates with the cylinder on the opposite side of the piston 22 by means of a port 26.

By reason of the above described arrangement fluid pressure can be introduced into the cylinder 20 on either side of the piston 22; the conduits 24 being included in a valve-controlled fluid pressure system, not otherwise shown.

When fluid pressure is introduced into the cylinder 20 by the conduit 25, said cylinder is advanced relative to the piston 22, which is stationary. This causes the head unit 3 to forcefully advance along the ways 2; such advance being under the direct control of the operator who can regulate the delivery of fluid pressure to the device. To retract the head unit 3 fluid pressure is relieved from the conduit 25 and introduced into the tubular piston rod 21 and through the port 26, causing the cylinder 20 to travel rearwardly.

In order to adjustably limit, to an accurate extent, the advancing movement of the head unit 3, there is provided a limit rod 27 fixed to the end hub 14 and projecting in slidable relation through the rigid upstanding end bracket 23. Outwardly of such bracket the limit rod 27 has limit nuts 28 threaded thereon, and a limit sleeve 29 is removably disposed on said rod between the nuts 28 and the bracket 23. After predetermined advance of the head unit 3 the nuts 28 abut the sleeve 29, which in turn engages the bracket 23, thus effectively limiting further advance of said head unit.

For the purpose of assuring of non-chattering, accurate lineal motion of the head unit 3, the longitudinal supporting flanges 7 are carried in ways 2 which comprise the following adjustable structure:

Each way 2 comprises an integral upstanding supporting ledge 30 which has a flat upper surface upon which the corresponding flange 7 bears at the bottom. A longitudinal guide bar 31 is secured in connection with the ledge 30 in guiding relation to, and directly laterally outwardly from said corresponding flange 7; there being a hold-down and guide plate 32 mounted in connection with the top of the guide bar 31 and overhanging the top of said flange 7.

Figure 3:
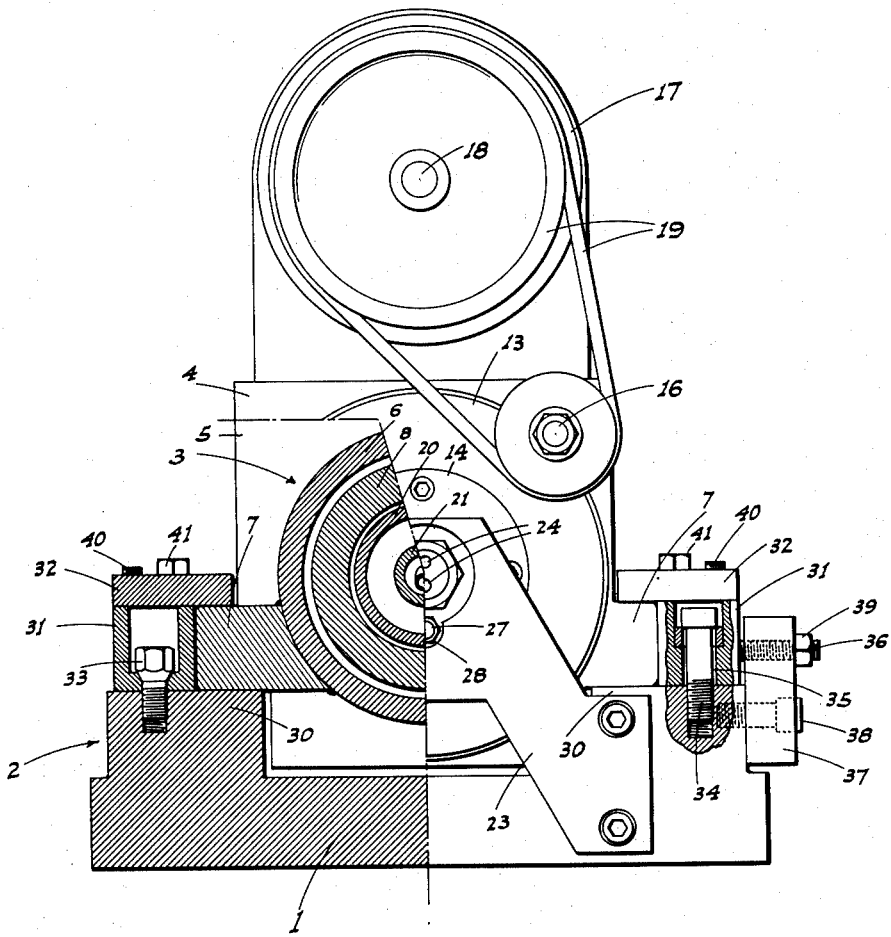
Fig. 3 is an end view of the lathe structure, partly in section.

By reference to Fig. 3, one guide bar 31 is non-adjustably secured to the adjacent ledge by longitudinally spaced bevel cap screws 33, while the guide bar 31 of the other way 2 is laterally adjustable by reason of the following arrangement:

Cap screws 34, disposed in longitudinally spaced relation, extend through transversely elongated slots 35 in the corresponding guide bar 31, and thence thread into the adjacent ledge 30. To laterally adjust this guide bar 31 there is provided adjustment screws 36 threaded through a rigid longitudinal plate 37 on the bed, and said screws bear against the outside of the adjustable guide bar 31. The plate 37 is held in place by attachment screws 38, while the adjustment screws 36 are normally locked by lock nuts 39 thereon bearing against said plate 37. Thus, by loosening the screws 34 and adjusting the screws 36, the adjacent guide bar 31 may be adjusted in its lateral position and relative to the stationary guide bar 31.

The hold-down and guide plates 32 are vertically adjustable by longitudinally spaced set screws 40, disposed in laterally offset relation laterally, and such hold-down and guide plates are secured to the guide bars 31 by hold-down bolts 41.

By proper relative adjustment of the guide bars 31 in a horizontal plane, and proper vertical adjustment of the hold-down guide plates 32, the ways 2 can be set to receive the flanges 7 with the desired accurate and close running fit.

The above described lathe structure is operative for many varied types of machining operations wherein accuracy is requisite, and wherein the tool can be secured to the attachment flange 11 and the work to the bed, or vice versa.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as described by the appended claims.

Having thus described the invention, the following is claimed as new and useful, and upon which Letters Patent are desired:

1. A reciprocable lathe head unit comprising a rotary spindle journaled in the head unit, a cylinder extending inside the spindle and fixed to said head unit, and hydraulic means associated with the cylinder for advancing or retracting the head unit.

2. A lathe comprising a bed having ways thereon, a head unit, mounting means for supporting the head unit on the ways for reciprocation, a rotary spindle journaled in the head unit, the spindle being adapted for attachment of a tool or work, power means on the head unit arranged in driving connection with the spindle, a non-rotary cylinder in the spindle and secured to the head unit, and hydraulic means associated with the cylinder for advancing or retracting the head unit.

3. A lathe comprising a bed having ways thereon, a head unit adapted for reciprocation on the ways comprising a rotary spindle journaled in the head unit, a cylinder extending inside the spindle and fixed to said head unit, and hydraulic means associated with the cylinder for advancing or retracting the head unit.

4. A lathe structure comprising a bed having ways thereon, a head unit comprising a tubular body and side flanges on the body disposed in sliding relation in the ways, a tubular spindle of substantially the length of the body disposed concentrically within the body and journaled for rotation therein, power means mounted on the body and connected in driving relation with the spindle, a first tubular member fixed to the body and projecting into the spindle concentrically therewith, a second tubular member fixed to the bed and projecting into said first tubular member concentrically therewith, an end hub on the body slidably mounted over said second tubular member, a piston on the inner end of said second tubular member, and means for respectively admitting and releasing fluid pressure through the second tubular member to either side of the piston.

5. A structure as in claim 4 in which the drive means for the spindle includes a gear on the outer end of the spindle adjacent the outer end of the body, an electric motor mounted on the body and traveling therewith, the motor being connected in driving relation with the gear.

6. A lathe structure comprising a bed having ways thereon, a head unit, means mounting the head unit on the ways for longitudinal advancing and retracting motion, a tubular rotary spindle journaled in the head unit, the spindle being exposed at its forward end for attachment of a tool or work, an electric motor on the head unit arranged in driving connection with the spindle, a non-rotary cylinder in the spindle and secured at its rear end to the head unit, a piston in the cylinder, a piston rod extending from the piston through the rear end of the cylinder, means rigidly connecting the piston rod to the bed, and conduits arranged to deliver fluid under pressure to the cylinder on one side or the other of the piston, selectively.

ROBERT G. LE TOURNEAU.

REFERENCES CITED

The following references are of record in the file of this patent:

UNITED STATES PATENTS

| Number | Name | Date |
| --- | --- | --- |
| 1,045,370 | Calahan | Nov. 26, 1912 |
| 1,852,915 | Bohne | Apr. 5, 1932 |
| 1,947,829 | Cole | Feb. 20, 1934 |
| 1,970,023 | Schroeder | Aug. 14, 1934 |
| 2,012,066 | Haas et al. | Aug. 20, 1935 |
| 2,167,609 | Dolle | July 25, 1939 |
| 2,313,613 | Boillat | Mar. 9, 1943 |
| 2,333,250 | Hegg | Nov. 2, 1943 |
| 2,450,972 | Le Tourneau | Oct. 12, 1948 |